United States Patent [19]

Owen

[11] 4,082,462

[45] Apr. 4, 1978

[54] AUTOMATIC SPACE SEXTANT

[75] Inventor: William J. Owen, Littleton, Colo.

[73] Assignee: Martin Marietta Corporation, Rockville, Md.

[21] Appl. No.: 660,590

[22] Filed: Feb. 23, 1976

[51] Int. Cl.$^2$ ............................................. G01B 11/26
[52] U.S. Cl. ................................... 356/152; 33/268; 250/203 R; 356/141
[58] Field of Search ............... 356/141, 152, 140, 138; 250/203 R, 231 SE; 33/268, 269

[56] References Cited

U.S. PATENT DOCUMENTS

| | | | |
|---|---|---|---|
| 2,758,377 | 8/1956 | Claret et al. | 356/141 |
| 3,001,289 | 9/1961 | Carbonara | 356/141 |
| 3,293,980 | 12/1966 | Benedetti | 356/141 |
| 3,448,272 | 6/1969 | Slater | 356/152 |
| 3,953,132 | 4/1976 | Michelson | 356/141 |

Primary Examiner—S. C. Buczinski

Attorney, Agent, or Firm—Sughrue, Rothwell, Mion, Zinn and Macpeak

[57] ABSTRACT

A navigational system for spacecraft utilizes two telescopes gimbaled on a common axis to measure the scalar angle between a star and the lunar limb. The common axis is the axis of rotation of a momentum wheel that carries a light source on it for the generation of timing pulses. This source enhances signal strength by addition of the source generated ray to that received by each telescope. The entire collimated light source is carried by the wheel and the beam is divided equally between telescopes. The collimated rays are imaged by the telescope assembly and this image sweeps across sensor assemblies to generate discrete timing pulses. The trackers employ closed-loop servo systems to center on respective targets and utilize torque motors to drive the trackers relative to the measurement head case.

7 Claims, 2 Drawing Figures

AUTOMATIC SPACE SEXTANT

STATEMENT OF ORIGIN

This invention was made in the performance of work under a Government contract and may be manufactured and used by or for the Government for governmental purposes without the payment of any royalties thereby or therefor.

BACKGROUND OF THE INVENTION

1. Field of the Invention

The present invention relates to a space navigation device usable as the prime navigation sensor for a completely autonomous spacecraft of satellite navigation system.

2. Prior Art

Systems for determining the angular position between a spacecraft and a source of radiation such as a distant star or other celestial body are known and have been used in a variety of applications. The particular choice of spacecraft navigation system is a function not only of the operation of the spacecraft, but also the type of stabilization system utilized on board the spacecraft. The type of sensors employed can generally be categorized into three broad groupings.

The first grouping comprises analog sensors comprising a pair of photo conductive devices connected as such that a differential output is derived from them. The differential output varies as a function of the projection angle of the vector of the radiation image on the planar surface formed by the photoconductive sensors. These devices, generally known as star trackers, utilize combinations of light baffles and sun shades to provide functions varying as a function of the angular position of the radiant emitting celestial body relative to the detector surface. In order to derive signals indicative of the angular position of the radiant source into two directions, orthogonal to each other, multiple sensors are required. Also, devices of this type require each of the photoconductive sensors to be very closely matched in order to maintain accuracy. The telescopes used in such star trackers are generally large and require extensive thermal and mechanical stability of the photo conductive devices to maintain accuracy and alignment. Hence, the practical application of these devices for making the accurate determinations of angular position which are necessary can be obtained only if the field of view of the detector is relatively narrow, less than 10° of arc. Also, detectors of the photo conductive type generally have an inherently slow response time, and their employment on spin-stabilized spacecraft cannot generally be effectuated. Therefore, the limitations of the use on this type of device as primary navigation sensors have generally been limited with to 3-axis stabilized or gravity gradient stabilized bodies, and in those cases, because of weight restraints, such star tracker devices have been used as a primary sensor, i.e., a lock-on device for a sole star. Also, a further problem inherent with the use of the photo-conductive type of devices of this group is that they cannot usually be employed with lens systems, so that measurements of celestial bodies having relatively low light emission, such as the moon and secondary level stars, are difficult.

A second general type of navigational sensor utilized for space navigation is the reticle time measuring system, and this type of device is applicable only to a spin-stabilized spacecraft. Spin-stabilized bodies generally spin at rates approximating 100 rpm, and a reticle containig a pattern of slits is located in front of a photocell to provide radiation pulses from a celestial body on the photocell in response to the spin of the spacecraft. The time between detection of ajacent radiation pulses is measured to provide the measure of angular position. Obviously, it is necessary to reference the detected time between adjacent pulses to the stable spin period of the spacecraft. The use of analog controllers on the ground, coupled with known orbits, make these particular type of devices relatively simple and inexpensive. However, practical experience has found that the accuracy thereof is limited only to measurements of approximately 1° of arc. Hence, for precision navigation, this type of device is generally unsatisfactory. A modification of the reticle time measuring system, employed for spinning spacecraft, is the digital reticle system. In this type of navigation device, a slit reticle is located in front of a binary of Gray-coded pattern of several photocell detectors. The position of the celestial body image is derived by the binary state of the several detectors in an image plane. For use in spinning vehicles, it is necessary to employ an auxiliary detector to indicate when radiation from the celestial body is in the sensor field of view. Also, to provide measurements of the body in two orthogonal directions, it is necessary to employ a pair of detectors. While digital reticle systems are inherently precise, their resolution is limited as a function of the spectral nature of the radiant energy derived from the body. Working experience with such devices has shown that radiation from the sun subtends an arc of 32 minutes (') which can be detected with the digital type device. If further refinement of the data is required to obtain accuracies, for example, to one arc minute, complex and expensive interpolation using computerized techniques is required. Also, inherent in such devices when utilized on spin-stabilized bodies is that measurements can be derived only once during each spin cycle, and, accordingly, the amount of information which may be derived with such devices is limited.

The patent literature is replete with a variety of attempts of the types mentioned above to achieve a practical and reliable navigation system. For example, a series of patents to Lillestrand, typified by U.S. Pat. No. 3,591,260, and patents to Aroyan et al, typified by U.S. Pat. No. 3,144,555, typify attempts to devise solutions using the reticle system, both in analog and digital contexts. Also, various patents have attempted to devise sextant arrangements which are roughly analogous to the optical star tracker type of devices employed in 2-axis stabilized bodies. As typified by the patent to Carbonara et al, U.S. Pat. No. 2,941,082, a sextant is shown which operates only in a gravitational field by measuring the angle between a heavenly body and a local gravity vector. Also, devices which are hybrids of various techniques are shown. Typical is the patent to Farthing et al, U.S. Pat. No. 3,744,913, which shows the measurement of the center of a radiation emitting celestial body utilizing a detector including four electrodes to determine the image of the body. This type of device is utilized on a spin-stabilized spacecraft primarily as a sun sensor.

SUMMARY OF THE INVENTION

The present invention is an improvement over my copending application entitled "Navigation Sensor" which is commonly assigned. Both inventions are utilized as high altitute autonomous navigation systems for spacecrafts by utilizing a space sextant which measures the scalar angle between a navigation star and the lunar limb, or the lunar limb to an earth-fixed point source of light. In its broadest forms, as set forth in the copending case, the sextant consists of two telescopes gimbaled on a common axis of a momentum wheel. Each tracker is aligned to its respective target, and a very narrow mirror is rotated through an arc crossing each optical path of a respective tracker at a constant angular velocity. As the mirror passes through the optical axis of the first tracker, a timing sensor sees an impulse of light ($T_1$). As the mirror continues in its arc, it will pass through the optical axis of the second tracker, and at that instant, a second timing sensor will see an impulse ($T_2$). The scalar angle between the two collimated light sources is $T_1 = W(T_2 - T_1)$. $T_1$ and $T_2$ are respectively the timing pulses used to start and stop a digital counter which counts a precision clock. The corresponding binary number represents the properly scaled scalar angle between the telescope optical axes. As the mirror continues its arc, it will again pass through the optical axis of the first tracker, at which instant the first timing sensor sees an impulse ($T_3$) and the complementary angle $T_2 = W(T_3 - T_2)$. This complementary angle provides a second measurement of the included angle ($T_1$) for each revolution of the wheel. Typically, the mirror rotates at an angular velocity of approximately 60.6 radians/second, or 10 revolutions per second. At this angular velocity, 20 statistical measurements of the included angle per second can be made, and by the averaging of these samples, the removing of pointing servodynamic errors from the measurement can be accomplished. While the light generated from the stars or the limb of the moon can be utilized to produce the signal required for the time pulse generation, as in the companion application, the present invention utilizes the light from a light source as a substitute for this ray in the sextant.

This particular invention reduces the number and magnitude of the measurement sensitivities in the system. Specifically, all first order optical sensitivities are eliminated by this invention, and the sensitivity to sensor gain stability is greatly reduced over the period concept as disclosed in my copending application. Moreover, that original concept required cool timing sensors due to the low photon throughput. This invention eliminates the need for cooled sensors. Additionally, this invention is a clear improvement over the prior cencept in two other material areas. One problem of the original concept was that two detectors were required for each telescope, one for tracking and one for pulse generation. A second undesirable feature of the original concept was that the optical devices that correlated the time pulse from one tracker to that of the other were not common. These two requirements in the original concept made that invention highly susceptible to thermal distortions and misalignments.

Accordingly, it is a first object of this invention to eliminate and and improve the difficulties encountered in the design of the first dual-tracker space sextant.

It is another object of this invention to eliminate thermal distortions and misalignments attendant to systems requiring cooled sensors.

Still another object of this invention is to eliminate the requirement for multiple detectors for each tracker.

Yet another object of this invention is to provide a system wherein a light source is used as a substitute for a light originating from the celestial body which was previously required for time pulse generation.

It is another object of the present invention to provide a new and improved device for enabling the angular position between two sources of radiation to be ascertained.

Another object of this invention is to provide a space sextant for enabling the determination of the relative position between a moving spacecraft and two celestial bodies to be derived.

A further object of this invention is to provide a relatively inexpensive, yet highly accurate device for the determination of the position of two celestial bodies to be determined relative to a spacecraft.

Still a further object of this invention is to provide a high accuracy space navigation sextant utilizing radiation from a celestial body and a point source emanating on the surface of the earth.

These and still other objects and advantages of this invention will become apparent from consideration of the following detailed description of one specific embodiment thereof, especially when taken in conjunction with the accompanying drawings.

DESCRIPTION OF THE PREFERRED EMBODIMENT

Figure 1:
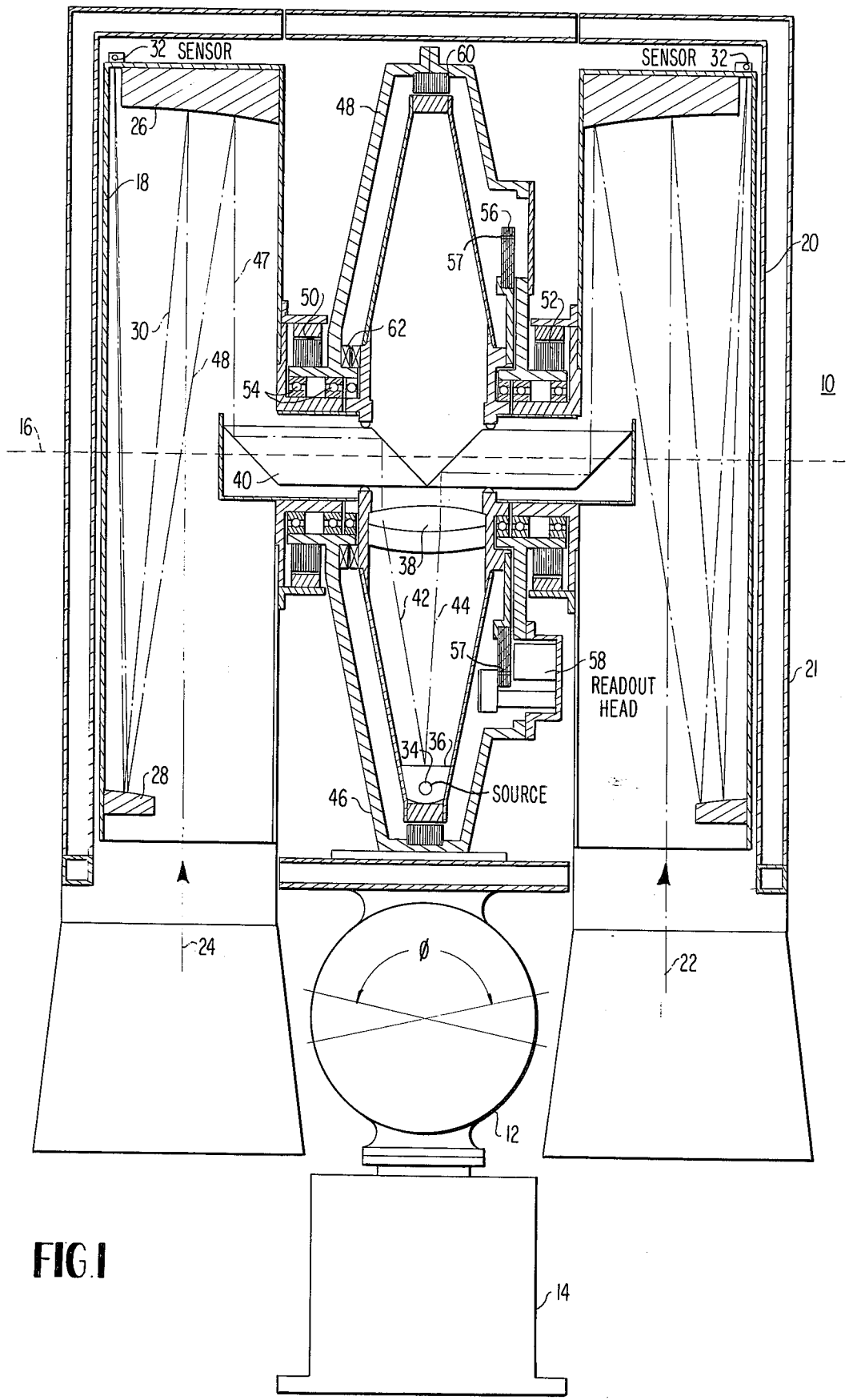
FIG. 1 is a schematic diagram of the components of the space sextant.

Referring now to FIG. 1, a detailed cross-sectional drawing of the space sextant is shown. The sextant measuring head, shown generally at 10, is rotated into the measurement plane by $\phi$ gimbal 12 and $\psi$ gimbal 14. Typically, the gimbal limit is + or − 80°. The measurement plane is defined by the star and limb vectors from the sextant. The cross product of the star and limb vectors define the proper orientation of the measurement spin vector, shown as dotted line 16. Each of the two tracker assemblies 18 and 20 are free to rotate independently about the axis 16.

In this invention, since complete symmetry in telescopes exists, it does not matter which tracker is used for star or limb tracking. Assuming that each gimbaled telescope assembly has been driven to its proper angle to see the star/limb, hence resulting in acquisition taking place, the star and lunar limb energy enter the tracker assemblies via rays shown as dotted lines 22 and 24. For purposes of explanation, only the transmission of energy through the tracker 18 will be explained; however, it is apparent that an identity of function occurs in tracker 20. The rays travel through the tracker assembly 18 and are reflected by primary mirrors 26 to the secondary mirrors 28. This reflected path is shown as dotted line 30. The energy is then reflected from secondary mirror 28 onto sensor 32, which is a multiple function sensor. Sensor 32 senses the imaged star/limb energy to derive in plane (tracker gimbal servo error signals) and cross plane error signals to maintain the sextant measurement head orientation in the plane of measurement by driving the $\psi$ and $\phi$ gimbals 12 and 14. Additionally, the sensor assembly 32 is used to generate the discrete timing pulses utilized in making the angular measurement.

The timing pulses are generated in the following manner: A light source 34 illuminates a mask 36 which has a 10$\mu$ pinhole. The light passing through the pinhole is collimated by a lens 38 and is projected upon a prism assembly 40. The prism assembly 40 translates the collimated light from the collimator axis to the telescope axis as shown in dotted lines 42 and 44. The collimated beam is divided equally between the telescopes 18 and 20. The entire collimated light source, including the prism assembly 40, is mounted on a wheel assembly shown generally as 46. This wheel assembly rotates within the measurement head shown as 48. At a given instant, the collimated rays 42 and 44 will pass through the telescope assembly 18 via the same route as ray 24, as shown by the dotted lines 47 and 48. The collimated rays are imaged by the telescope assembly, and the image sweeps across the sensor assembly 32 to generate the discrete timing pulses.

The trackers are closed-loop servoed to center on the star or lunar limb, and the driving elements to effectuate this function are torque motors 50 and 52.for the respective telescope assemblies. As shown in FIG. 1, torque motor 50, for example, effectuates relative motion of telescope 18 vis-a-vis the head 48 via bearings 54.

The wheel assembly, characterized by casing 46 and measurement head 48, is driven at an angular velocity of approximately 50 radians/sec. which corresponds to $1.0368 \times 10^7$ arc sec/second by a phase locked loop. A typical phase locked loop is shown in the copending application. The phase locked loop can be commanded to rotate the wheel assembly by means of an oscillator located remotely from the sensor. The feedback (position) for the rotation of the wheel to the phase locked loop is taken by means of an optical transducer disc 56, which is read out via head assembly 58. When the wheel is in motion, the output from the readout head 58 will be a frequency. As in the copending application, the disc 56 has sine $2^{11}\theta$ and cosine $2^{11}\theta$ functions recorded on it. The sine and cosine functions 57 allow the extraction of phase information, and hence a very wide band high gain phase locked loop can be implemented. The wheel drive motor is shown schematically as a magnetic motor 60, and additional elements such as a rotary transformer 62 to power the collimator light source 34 are shown in FIG. 1.

Figure 2:
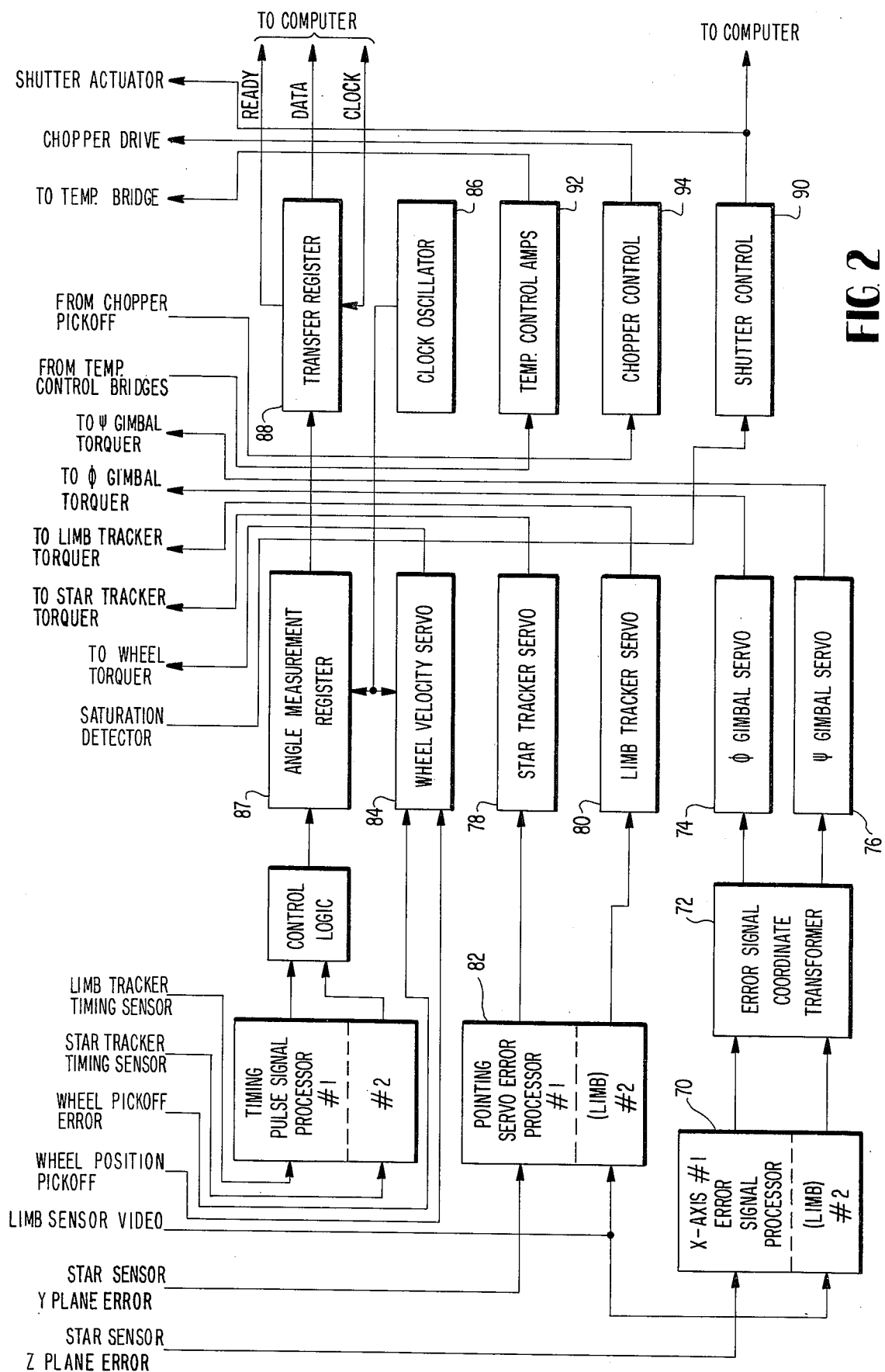
FIG. 2 is a schematic, functional block diagram of the wheel sextant system.

Referring now to FIG. 2, a functional diagram of the major control loops of the wheel sextant are shown in schematic fashion. Two major subsystems are the $\phi$ and $\psi$ gimbal servos used to orient and maintain the measurement head in the plane of measurement. These servos serve to function to control movement of gimbals 12 and 14 as shown in FIG. 1. Basically, two modes of operation are present. The first mode is generally known as slew and is used in making transition between stars. The particular angular relationship to command each of the gimbals to a new angle is computed by the navigation computer from an a priori knowledge of stars, time, attitude, and lunar ephemeris. Each loop is maintained in slew until star and limb acquisition signals are present. At that time, the gimbal loops would then switch to the track mode. The gimbal servo pointing errors are derived from the fine sensors 32, located on the star and limb trackers. These error signals, shown as star sensor Z plane error, star sensor Y plane error, and input from the limb sensor video are resolved into coordinates for the proper gimbal servomotors which then drive to align precisely the measurement head into the plane of measurement. As shown in FIG. 2, the respective inputs are first utilized to determine the X-axis error in processor 70, and the resulting error signals are fed to coordinate transformer 72 which determines the proper coordinate movements for the $\pi$ gimbal servo 74, $\psi$ gimbal servo 76, which are respectively used to drive the $\phi$ $\psi$ gimbal torquers.

Also shown in FIG. 2 are the tracker servos, which are comparable to the gimbal servos, except that they function in three different modes of operation. These tracker servos 78, 80 function in the slew mode, which is a mode used to drive the trackers in the measurement plane for acquisition, and the respective angles are also computed by the navigational computer. The second mode of operation is acquisition, which is a mode that is used to make a transition from coarse (wide field of view) sensors to fine (narrow field of view) sensors. The third mode of operation is the tracking mode, which is a mode that utilizes pointing error signals derived from in-plane fine sensor elements. Pointing servo processor 82 receives star sensor Y-plane errors and generates a signal to drive star tracker servo 78, which in turn is used to provide an input to the star tracker torquer 52. Similarly, the limb sensor video signal is resolved into a servo pointing error through processor 82, and is used to drive the limb tracker servo, which in turn provides a signal to the limb tracker torquer 50.

The next major servo loop in the wheel sextant functional diagram FIG. 2 is the velocity servo for the wheel, which is a phase locked loop. The phase locked loop is shown in greater detail in my copending application. Wheel position error from transducer disc 56, as read out by read-out sensor 58, is shown as an input to this velocity servo 84. Although the feedback is a position signal, when the wheel has an angular velocity, its feedback output is in the form of a frequency. The servo's phase lock logic locks the feedback frequency to a command frequency from a master oscillator 86. For the wheel to have a constant speed, errors in the feedback element must be determined and compensated, and this loop includes means to accomplish that compensation. The output of the wheel velocity signal is generated to the wheel drive motor 60, to effectuate this constant velocity.

The remaining major function, shown in FIG. 2, is that of angle measurement determination. This determination consists of averaging measurements and correcting the measurement for in-plane satellite body rates. These rates are determined very precisely from the telescope that is utilized in tracking the star in the system. A pair of independent measurements are taken for each revolution of the wheel, which consists of the star tracker timing sensor output and the limb tracker timing sensor output. This pair of measurements consists of the direct angle and its complement and is taken every 0.125 seconds. The clock 86 is flagged when the $n/2$th measurement is taken, and the corresponding average angle is the angle that corresponds to the time that was flagged. This measurement is stored in register 86 and is transferred to the navigational computer via a transfer buffer register 88. As shown in FIG. 2, the only inputs to the angle measurement function are the precise timing pulses from sensors 32 of the star and limb tracker sensors and the clock frequency from the oscillator 86.

Other functional blocks, shown in FIG. 2, are used for support of auxiliary functions. A saturation detector is used to provide an input to a shutter control 90, which has its output to the navigational computer. As a result of intense radiation, which may be encountered, the shutter control is used to actuate shutters, shown schematically in FIG. 1 as the outer casing 21 of the system.

Also shown in FIG. 2 is a temperature control circuit 92 used for the measurement head and error signal processing 94 for control of the chopper drive. These latter functions are common in all spacecraft navigational systems to provide environmental support and form no part of this invention.

While the preferred embodiment of this invention has been shown and described, it should be emphasized that suitable additional modifications, changes, substitutions, and alterations may be made without departing from the invention.

What is claimed is:

1. In an apparatus for determining position by obtaining a plurality of celestial fixes including first and second optical means gimbaled for movement about a common axis of rotation, said first optical means disposed to receive radiation emitted from a first celestial body and said second optical means disposed to receive radiation emitted from a second celestial body, first and second timing sensors associated respectively with each optical means to receive radiation from said celestial bodies, the improvement comprising:

rotating means disposed on said common axis of rotation, said rotating means carrying a source of light thereon, said source generating a collimated beam of light; and means disposed on said rotating means to direct said collimated beam of light through said first and second optical means on to said sensors, whereby said collimated beam is utilized to generate timing signals indicative of the scalar angle between said first and second optical means.

2. The apparatus of claim 1 wherein said rotating means is a momentum wheel and further including a phase-locked servo loop to maintain the rotating momentum wheel at a constant angular velocity.

3. The apparatus of claim 2 further including an encoder disc rotating with said momentum wheel to determine the rotational speed of said wheel.

4. The apparatus of claim 3 wherein said encoder disc has sine and cosine tracks thereon, and further including means to sense said tracks as the disc rotates, said means to sense said tracks providing an input to said phase-locked loop.

5. The apparatus of claim 1 wherein said first and second optical means comprise a pair of optical telescopes and further including first motor means to gimbal one of said telescopes and second motor means to gimbal the other of said pair of telescopes.

6. The apparatus of claim 5 wherein each of said telescopes is closed-loop servoed to center on radiation received from said celestial bodies.

7. The apparatus of claim 1 wherein said means disposed on said rotating means to direct said collimated beam of light comprises a prism assembly aligned on said axis of rotation and a focusing lens between said light source and said prism assembly.

* * * * *